(12) United States Patent
Halasz (10) Patent No.: US 12,301,924 B2
(45) Date of Patent: May 13, 2025

(54) SYSTEM AND PROCESS FOR DYNAMIC PAN, ZOOM OR TILT FOR VIDEO EDITING

(71) Applicant: Josip Halasz, Dubai (AE)

(72) Inventor: Josip Halasz, Dubai (AE)

( * ) Notice: Subject to any disclaimer, the term of this patent is extended or adjusted under 35 U.S.C. 154(b) by 15 days.

(21) Appl. No.: 18/260,798

(22) PCT Filed: Jan. 9, 2022

(86) PCT No.: PCT/HR2022/050001
§ 371 (c)(1),
(2) Date: Jul. 10, 2023

(87) PCT Pub. No.: WO2022/153071
PCT Pub. Date: Jul. 21, 2022

(65) Prior Publication Data
US 2024/0080517 A1    Mar. 7, 2024

Related U.S. Application Data

(60) Provisional application No. 63/136,806, filed on Jan. 13, 2021.

(51) Int. Cl.
*H04N 5/232* (2006.01)
*G06T 7/10* (2017.01)
*H04N 21/431* (2011.01)
*H04N 21/472* (2011.01)

(52) U.S. Cl.
CPC .......... *H04N 21/4318* (2013.01); *G06T 7/10* (2017.01); *H04N 21/47217* (2013.01); *G06T 2207/20132* (2013.01)

(58) Field of Classification Search
CPC ......... H04N 21/4318; H04N 21/47217; H04N 5/232; H04N 5/262; G06T 7/10; G06T 2207/20132

USPC ......................................................... 348/553
See application file for complete search history.

(56) References Cited

U.S. PATENT DOCUMENTS

| 10,986,308 | B2* | 4/2021 | Huynh Thien ............................. H04N 21/234372 |
| 11,144,201 | B2* | 10/2021 | Cui ...................... G06F 3/04886 |
| 2016/0381306 | A1 | 12/2016 | Yang et al. |

FOREIGN PATENT DOCUMENTS

WO      WO2017096220 A1      6/2017

OTHER PUBLICATIONS

International Search Report and Written Opinion for PCT/HR2022/050001, mailed Apr. 21, 2022; 9 pages.

* cited by examiner

*Primary Examiner* — Trang U Tran
(74) *Attorney, Agent, or Firm* — CALDERON SAFRAN & WRIGHT P.C.

(57) ABSTRACT

A method and system for dynamically cropping a video image is disclosed. A user initiates the process by creating parameters for a cropping window, selecting, for example, size, zoom and tilt, and then maneuvering the cropping window, dynamically during playback of the video, on the screen showing the video playback. The movements of the cropping window during playback are controlled dynamically on screen via user manipulation of the crop window position vis-à-vis the background video playback. A new recording is created from the image(s) contained within the maneuvered crop window. This newly created video, from within the original video, can be saved, shared, discarded, or further edited.

20 Claims, 11 Drawing Sheets

SYSTEM AND PROCESS FOR DYNAMIC PAN, ZOOM OR TILT FOR VIDEO EDITING

CROSS-REFERENCE TO RELATED APPLICATIONS AND CLAIM TO PRIORITY

This application is a national stage application of International Application No. PCT/HR2022/050001 filed Jan. 9, 2022, which claims priority to U.S. Provisional Application No. 63/136,806 filed Jan. 13, 2021, the disclosures of which are incorporated herein by reference and to which priority is claimed.

FIELD OF THE INVENTION

The invention relates generally to editing video. More particularly, the invention relates to a system and process for dynamically cropping recorded video frames and creating a new video therefrom.

BACKGROUND OF THE INVENTION

With more video being produced every day by professionals, as well as by the general public, the need to improve the quality of the recorded video is increasing. There exists a growing number of video editing applications, especially for public use, many of which are designed for mobile platforms, i.e., mobile phones. One of the features commonly used is a crop feature. Crop feature for video usually works in the following manner. User defines cropping window bound by the outer edges of the original video. The cropping process is executed and the new video consists of video frames which are derived by cropping each frame of the original video using the same (in terms of size and position relative to the frame of the original video) cropping window. On more sophisticated video editing platforms further functionality can be achieved. For example, a user can define different parameters of the cropping window for certain different frames of the video. The cropping process is executed, and the new video consists of video frames, all of which are derived by cropping frames of original video using the cropping window defined by parameters derived from the cropping windows defined by a user. Usually parameters of the cropping window for frames where the cropping window is not defined by user are derived by interpolating parameters of the cropping window for those frames where the cropping window is defined by user. This way a dynamic crop can be achieved where parameters of cropping windows vary with time. But in the case of a more sophisticated dynamic crop it can be a very laborious process of defining the crop window for many different individually selected frames. Because of the above, and the fact that this feature is available on commercial video editing platforms which require knowledge to operate, dynamic crop is out of reach of the general public.

SUMMARY OF THE INVENTION

An object of the present invention is to create user friendly dynamic cropping tool. Systems and methods are disclosed that enable features of dynamic pan, zoom and tilt where a user moves the pre-created/specified cropping window dynamically on the screen while showing the original video playback, a new video is created from the information contained and recorded within the dynamically moved cropping window.

By utilizing the described method an application can be developed that makes dynamic video cropping very user friendly and thereby within reach of the general public. For people more skilled in video editing it provides potentially significant time saving. Unlike other methods that provide static process of defining cropping parameters, the presented method(s) herein provides a dynamic process of defining cropping parameters.

Other methods that provide static process of defining cropping parameters are inevitably more time and labor consuming in a general case of dynamically cropping a video. The present method provides, unlike any other method, dynamic video crop using dynamic user input.

DETAILED DESCRIPTION OF THE INVENTION

The foregoing descriptions, formulations, diagrams, and figures are provided merely as illustrative examples, and they are not intended to require or imply that the steps of the various embodiments must be performed in the order presented or that the components of the invention be arranged in the same manner as presented. The steps in the foregoing descriptions and illustrations may be performed in any order, and components of the invention may be arranged in other ways. Words such as "then," "next," etc., are not intended to limit the order of the steps or the arrangement of components; these words are used merely to guide the reader through the description of the invention. Although descriptions and illustrations may describe the operations as a sequential process, one or more of the operations can be performed in parallel or concurrently, or one or more components may be arranged in parallel or sequentially. In addition, the order of the operations may be rearranged.

In this disclosure, the term "dynamic" when it is referred to as a feature means that the properties of the feature i.e., parameters that define the feature, vary with time.

In this disclosure the term "playback" is used to describe the process of reproducing video on a display unit either at normal (1×), slower than normal (<1×) or faster than normal (>1×) rate.

In this disclosure term recording (verb) is used to describe a process of assigning (storing or recording in computer memory) cropping parameters to certain particular timestamps or certain particular frames of the original video. Assigning cropping parameters in any other way, direct or indirect, to positions in video would not depart from the present disclosure. Other timestamps or frames are also considered to have been assigned cropping parameters if these are to be derived from cropping parameters that have been recorded. For example, parameters may be assigned to certain timestamps separated by a certain time interval and parameters for frames or timestamps between those certain timestamps are interpolated from parameters of those certain timestamps.

In this disclosure the term "recording" (noun) refers to stored cropping parameters data.

In this disclosure the term "cropping" (verb) is used to describe the process of creating a new video from the original video where frames of the new video are created by cropping frames of the original video using recorded cropping parameters.

In this disclosure the term cropping feature is used to describe the video editing tool used for creating a new video from the original video where frames of the new video are created by cropping frames of the original video using recorded cropping parameters.

Figure 1:
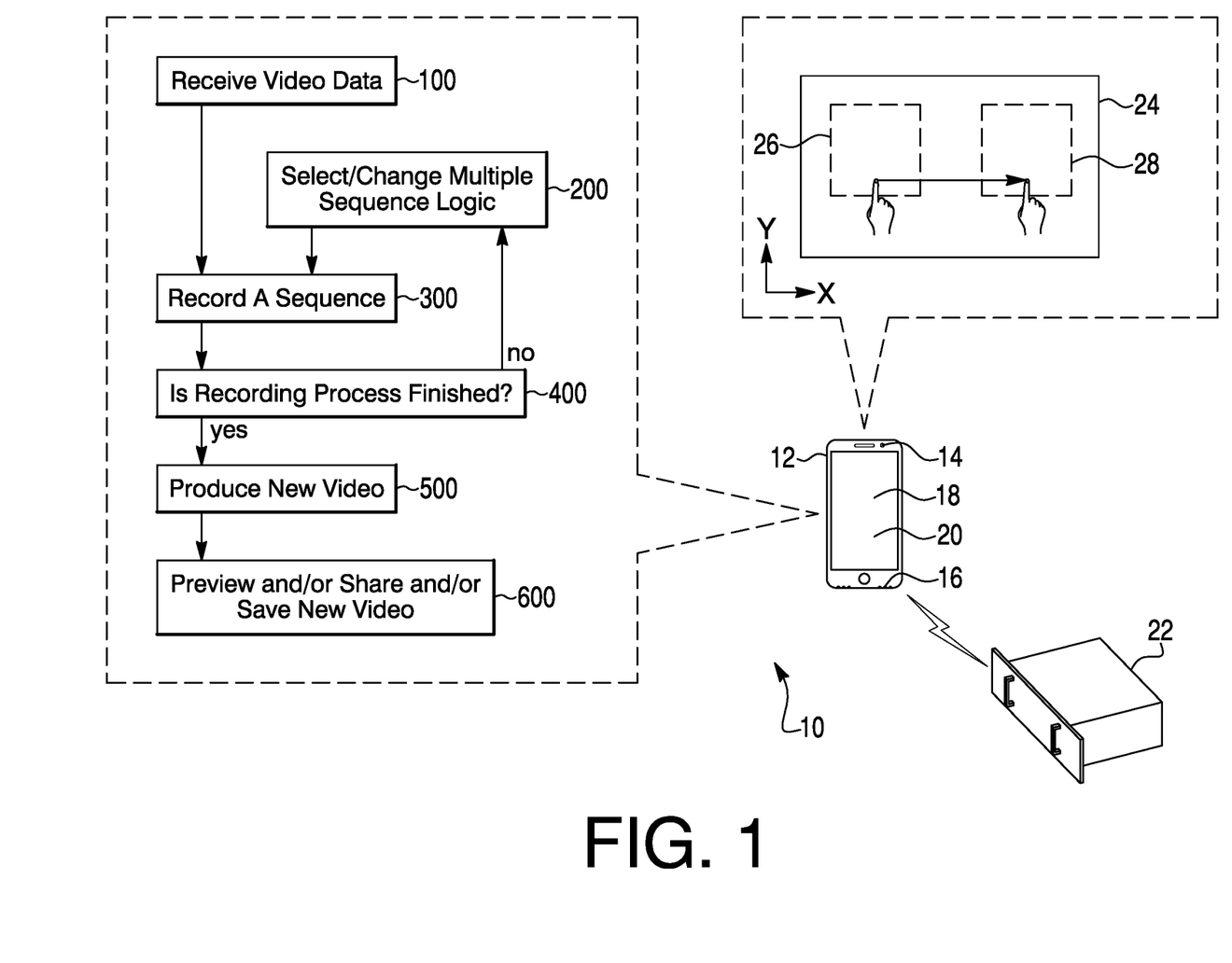
FIG. 1 illustrates an overview of system 10 for implementing the present system and method.

FIG. 1 illustrates an overview of system 10 for implementing embodiments of the disclosure. The system 10 includes the device 12 (mobile phone, tablet, etc.) coupled to or including a camera(s) 14, microphone(s) 16, a server 22, a screen 18 and an input device 20. If in the following description steps illustrated in the drawings are referred to the device, due to computing complexity or other reason the server 22 can perform the steps without departing from the present disclosure. The device 12 may capture video data 24 using camera(s) 14 or it may retrieve video data 24 from different types of storages including storages that are accessed through a type of network. This video data 24 may be of various types. An example of the first cropping window (26) and last cropping window (28) are depicted. Present disclosure is not limited to any kind of video data regardless of aspect ratio, pixel size or any other property. Even though illustrations depict the device 12 is as a mobile phone/tablet device the present disclosure is not limited to any kind of device as long as it features the functionality required to perform the steps. If, for example, video data will be retrieved from the storage the device may be not equipped with camera(s) 14 and microphone(s) 16. However graphical user interface comprised of components such as screen (18) and an input device (20) is necessary to perform some of the steps. Input devices 20 may be of different types such as touchscreen (input with finger or stylus pen), graphics tablet, touchpad, mouse, trackball, keyboard, etc. Also, user inputs may be coming simultaneously from plurality of same or different input devices. User inputs may be modified in a desirable way, set by user or otherwise, to achieve desired effect. Such modification may be in the form of smoothing user input. This disclosure is not limited to any particular types of modification.

The method may have the following embodiment. A user can (100) retrieve a video file from storage or from a video camera device or application. The user can select (302A) Fixed video mode (within (302) Select mode step) to have the video displayed in a fixed way on the screen of a mobile phone. The user can (304) select input logic. The user chooses (306) time stamp or frame of the video where to begin the recording sequence. The user is presented with a cropping window, and he can (308) define its initial parameters such as aspect ratio, size, position and angular position i.e. tilt against the displayed video in accordance with input logic. The user can (310) choose a recording speed. The user can (312) start recording which starts the playback of the video in a chosen speed. Simultaneously with playback and using touchscreen input, the user can (314) manipulate the parameters of the cropping window such as position, size and tilt against the fixed video display in accordance with input logic, while at the same time the recording algorithm records those parameters relating to the dynamic position of the cropping window as maneuvered by user digital manipulation on the input screen as the video plays back. The user can (316) stop recording which stops the playback and recording. The user can (318) preview the recording. If the user is not (400) finished with the recording process he may repeat steps 200 through 400. If the user is (400) finished with the recording process he may execute (500) the video producing process which creates a new video which consists of frames derived by cropping frames of the original video using the recorded cropping window parameters. The user may (600) preview the produced video. The user may (600) share the produced video. The user may (600) save the produced video.

The method may also have the following embodiment. The user can (100) retrieve a video file from storage or from a video camera device or application. The user can select (302B) Fixed cropping window mode (within (302) Select mode step) to have the video displayed on the screen of a mobile phone. The user is presented explicitly or implicitly with a fixed cropping window. The cropping window could be the edges of the mobile phone screen or the edges of initially displayed video. The user can (304) select input logic. The user chooses (306) time stamp or frame of the video where to begin the recording sequence. The user can (308) define initial parameters of the displayed video such as zoom, position and tilt against the cropping window in accordance with input logic. The user can (310) choose recording speed. The user can (312) start recording which starts the playback of the video in chosen speed. Simultaneously with playback, through touchscreen input the user can (314) manipulate the parameters of the video such as position, zoom and tilt against the fixed cropping window in accordance with input logic, while at the same time the recording algorithm records those parameters. The user can (316) stop recording which stops the playback and recording. The user can (318) preview the recording. If the user is not (400) finished with the recording process he may repeat steps 200 through 400. If the user is (400) finished with recording process he may execute (500) video producing which creates a new video which consists of frames derived by cropping frames of the original video using recorded cropping parameters. The user may (600) preview produced video. The user may (600) share produced video. The user may (600) save the produced video.

The method may have the following embodiment. User can (100) retrieve a video file from storage or from video camera device or application. The user can select mode 302C (within (302) Select mode step), where neither cropping window nor video will be fixed, to have the video displayed together with the cropping window on the screen of a mobile phone. The user can (304) select input logic. The user chooses (306) time stamp or frame of the video where to begin the recording sequence. The user can (308) define initial parameters of the cropping window such as aspect ratio, size, position and angular position i.e., tilt against the screen in accordance with input logic. The user can (308) define initial parameters of the displayed video such as zoom, position and tilt against the screen in accordance with input logic. The user can (310) choose recording speed. The user can (312) start recording which starts the playback of the video in chosen speed. Simultaneously with playback, through touchscreen input the user can (314) manipulate either/both the parameters of the video or/and parameters of the cropping window, while at the same time the recording algorithm records those parameters. Part of the input logic to handle such more complex input may be such that the input on the cropping window area manipulates cropping window parameters and input on the video area outside the cropping window area manipulates video parameters in accordance with the rest of the input logic. The user can (316) stop recording which stops the playback and recording. The user can (318) preview the recording. If user is not (400) finished with recording process he may repeat steps 200 through 400. If user is (400) finished with recording process he may execute (500) video producing which creates a new video which consists of frames derived by cropping frames of the original video using recorded cropping parameters. The user may (600) preview produced video. The user may (600) share produced video. The user may (600) save produced video.

In this disclosure term Input logic refers to the cropping parameters that can be manipulated and how user input is interpreted to manipulate them. The user input may be used to change all possible parameters, or it may be limited to changing only a subset of the possible parameters, not limited to any particular subset of parameters. It may interpret input on different areas of the screen in a different way.

Steps 400 and 200 may be omitted in an embodiment where multiple sequence recording is not enabled.

Steps 302 and 304 may be combined and presented to the user as a single step where user selects a combined mode which comprises of one of the modes 302A, 302B or 302C and such input logic that combined are practical for some purposes.

Examples of some practical mode and input logic combinations are presented on FIG. 3A-D, 4A-D, 5A-D but this disclosure is not limited to those. Examples illustrate single and dual input of same type (finger on a touchscreen). This disclosure is not limited to any types of inputs nor their number or combinations of types and numbers.

Figure 3A:
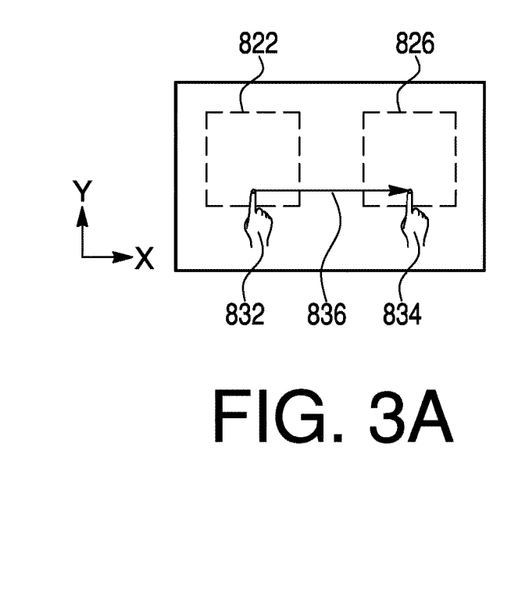
FIG. 3A-D illustrate an example of mode and input logic combinations for the present method.
Figure 3B:
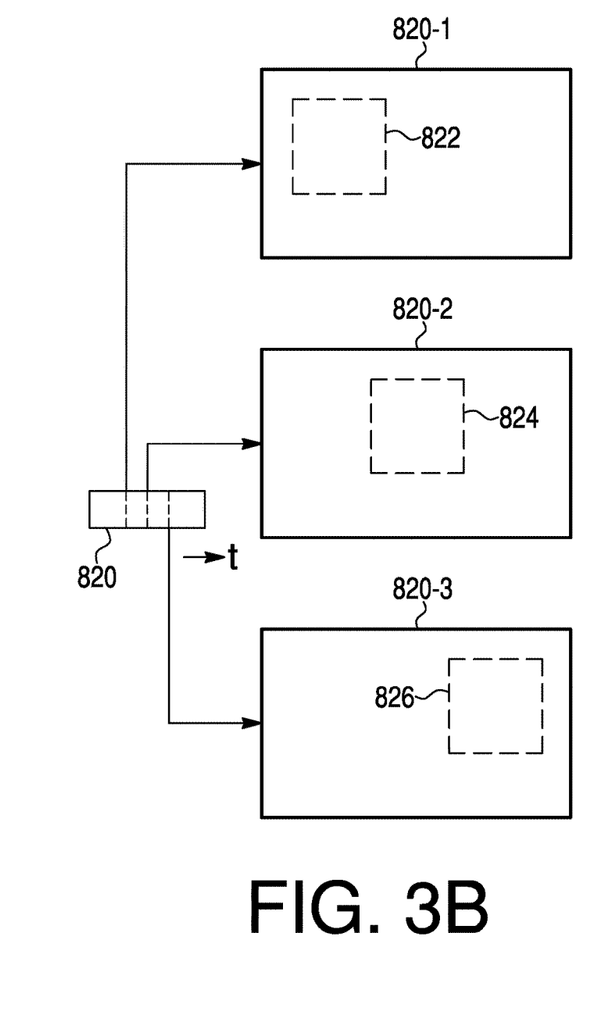
Figure 3C:
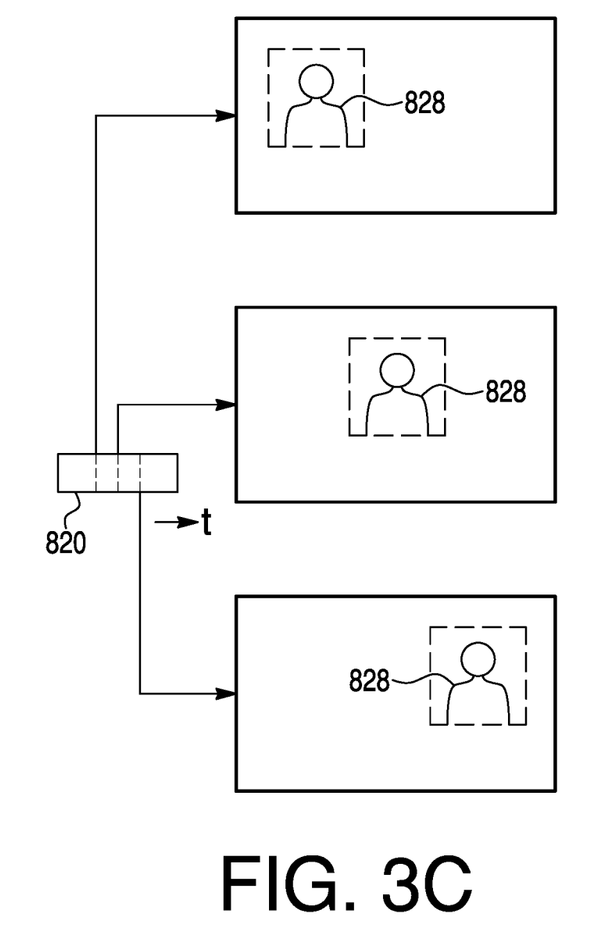
Figure 3D:
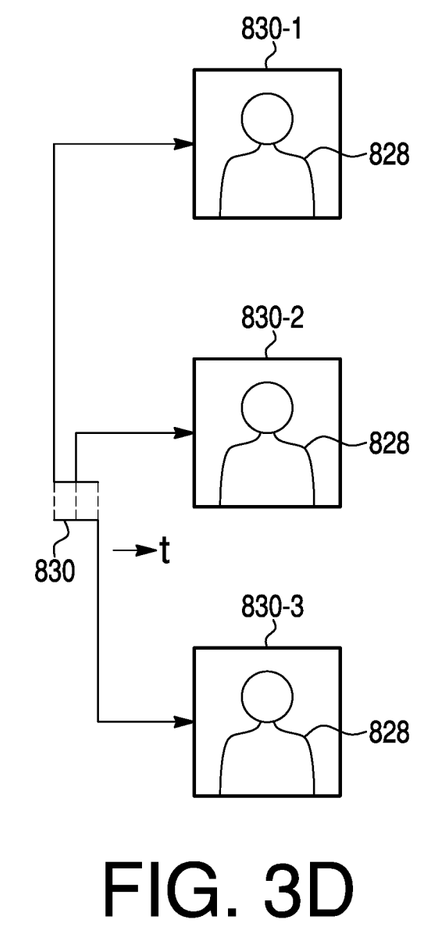

FIG. 3A-D illustrate an example of mode and input logic combination where (302A) fixed video mode is combined with input logic that allows only the position of the cropping window to be manipulated in order to create a panning effect within the pre-recorded video. FIG. 3A illustrates a single panning input from left to right i.e. in the positive x direction. The beginning of the panning input 832 determines the first cropping window 822, the continuous panning input 836 creates a plurality of intermediate cropping windows 824 and the end of the panning input 834 determines the last cropping window 826. In order to allow only for the panning effect, the input logic may be such that two finger input is interpreted as a single input of their center-weighted position. FIG. 3B illustrates the relation between the first cropping window 822 that is assigned to the first video frame 820-1 that is associated with first time, one of the intermediate cropping windows 824 that is assigned to the second video frame 820-2 that is associated with second time and the last cropping window 826 that is assigned to the third video frame 820-3 that is associated with third time. FIG. 3C illustrates how such panning effect can be used to track an object 828 in the received video 820 which is moving from left to right i.e. in the positive x direction. FIG. 3D illustrates the first 830-1, intermediate 830-2 and last 830-3 frame of the produced video 830 that has the tracked object 828 centered and of constant size, latter resulting from objects 828 constant size in the received video 830 and the constant size of the cropping window.

Figure 4A:
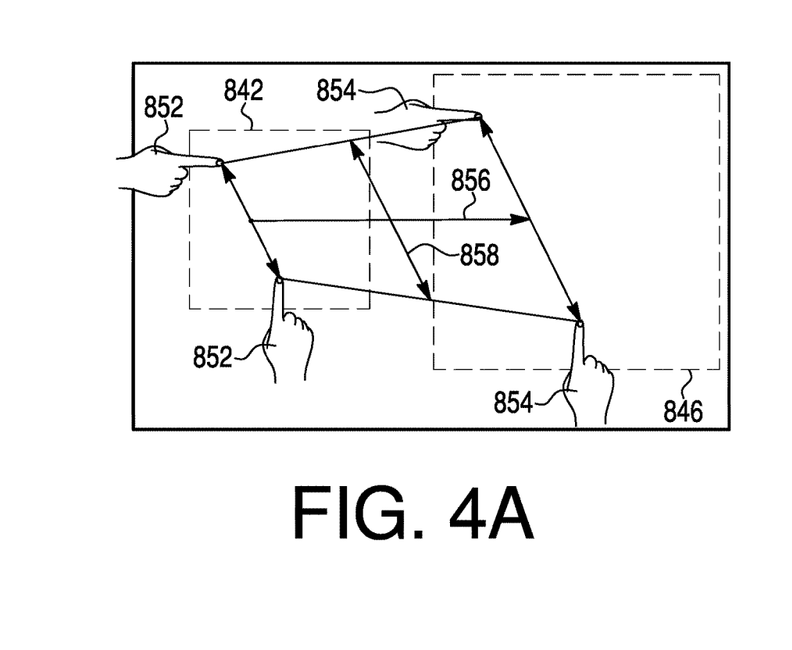
FIG. 4A-D illustrate a second example of mode and input logic combinations for the present method.
Figure 4B:
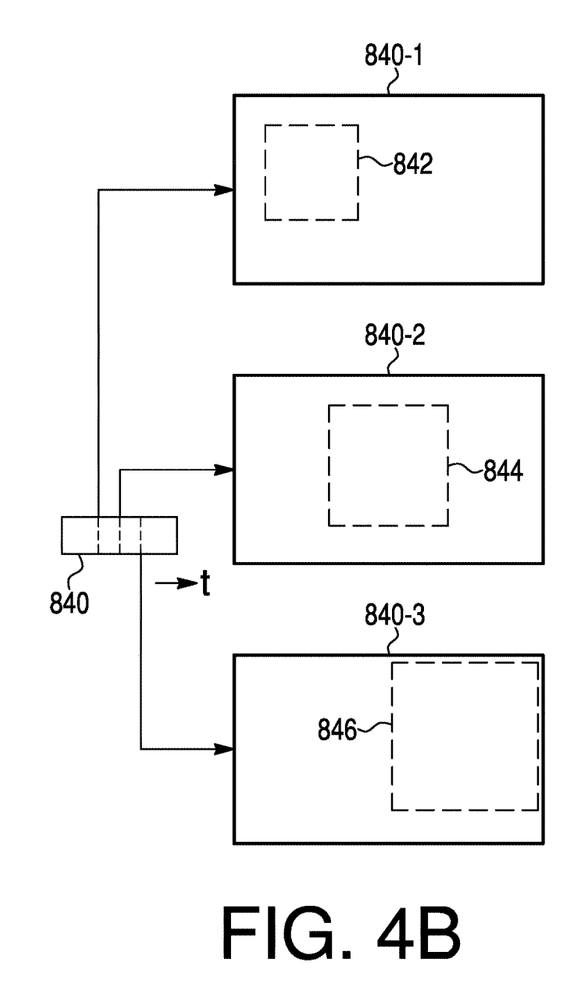
Figure 4C:
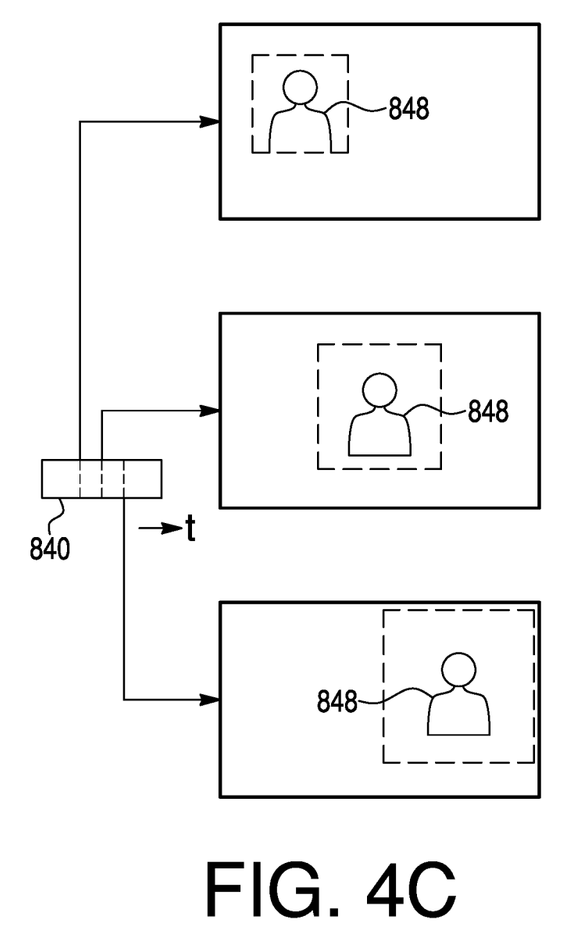
Figure 4D:
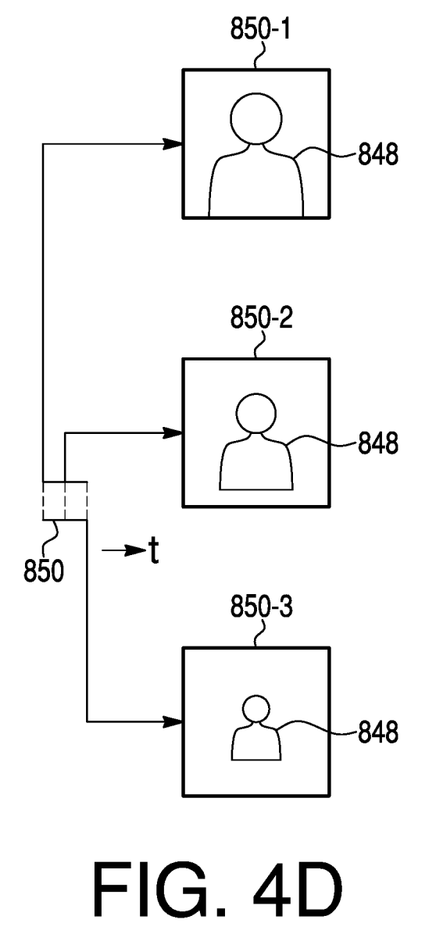

FIG. 4A-D illustrate an example of mode and input logic combination where (302A) a fixed video mode is combined with input logic such that panning input on the cropping window area is translated to movement of the cropping window thereby eventually producing a panning effect. Two finger panning input may be interpreted as a single input of their center-weighted position. Two finger pinching input may be translated to changing the size of the cropping window producing the zooming effect. Simultaneous panning and pinching can produce simultaneous panning and zooming effects. FIG. 4A illustrates a two-finger panning and pinching input from left to right i.e., in the positive x direction and increasing the distance between two fingers. The beginning of the input 852 determines the first cropping window 842, the continuous panning 856 and pinching 858 input creates plurality of intermediate cropping windows 844 and the end of the input 854 determines the last cropping window 846. FIG. 4B illustrates the relation between the first cropping window 842 that is assigned to the first video frame 840-1 that is associated with first time, one of the intermediate cropping windows 844 that is assigned to the second video frame 840-2 that is associated with second time and the last cropping window 846 that is assigned to the third video frame 840-3 that is associated with third time. FIG. 4C illustrates how such panning and zooming effect can be used to track and zoom out an object 848 in the received video 840 which is moving from left to right i.e., in the positive x direction. FIG. 4D illustrates the first 850-1, intermediate 850-2 and last 850-3 frame of the produced video 850 that has the tracked object 848 centered and of decreasing size, latter resulting from objects 848 constant size in the received video 850 and the increasing size of the cropping window.

Figure 5A:
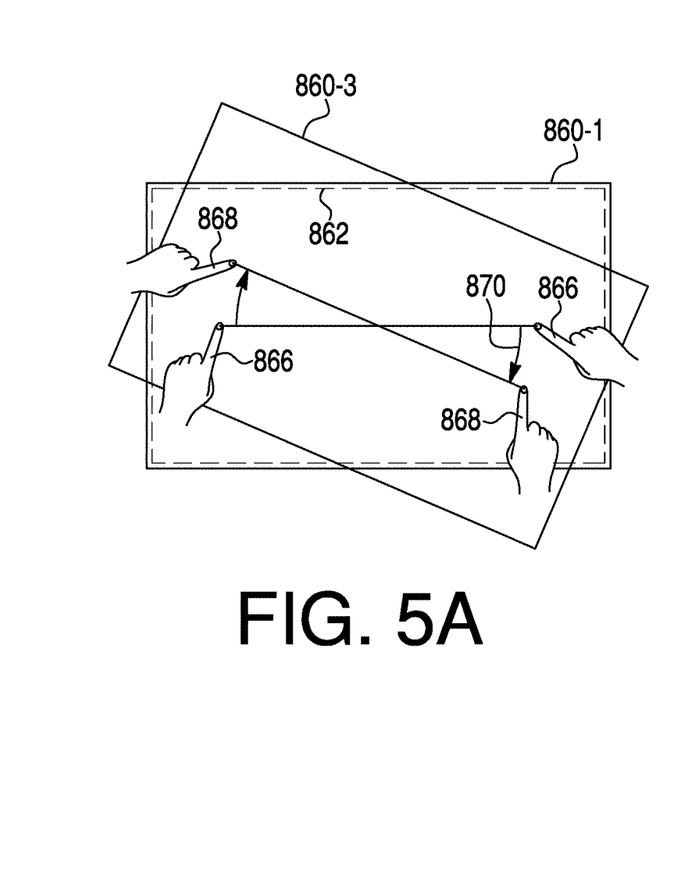
FIG. 5A-D illustrate a third example of mode and input logic combinations for the present method.
Figure 5B:
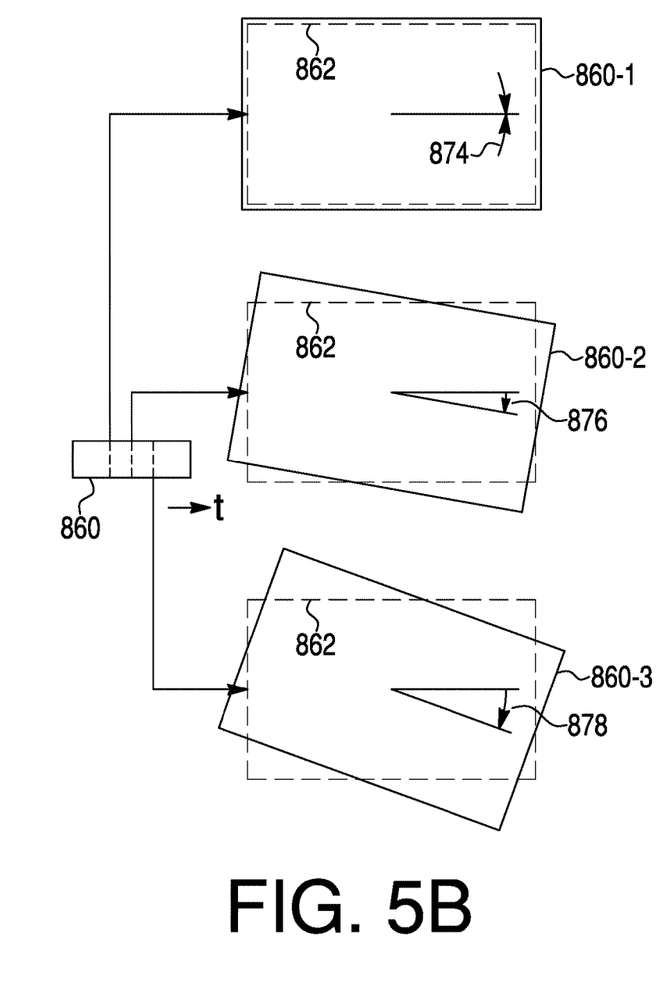
Figure 5C:
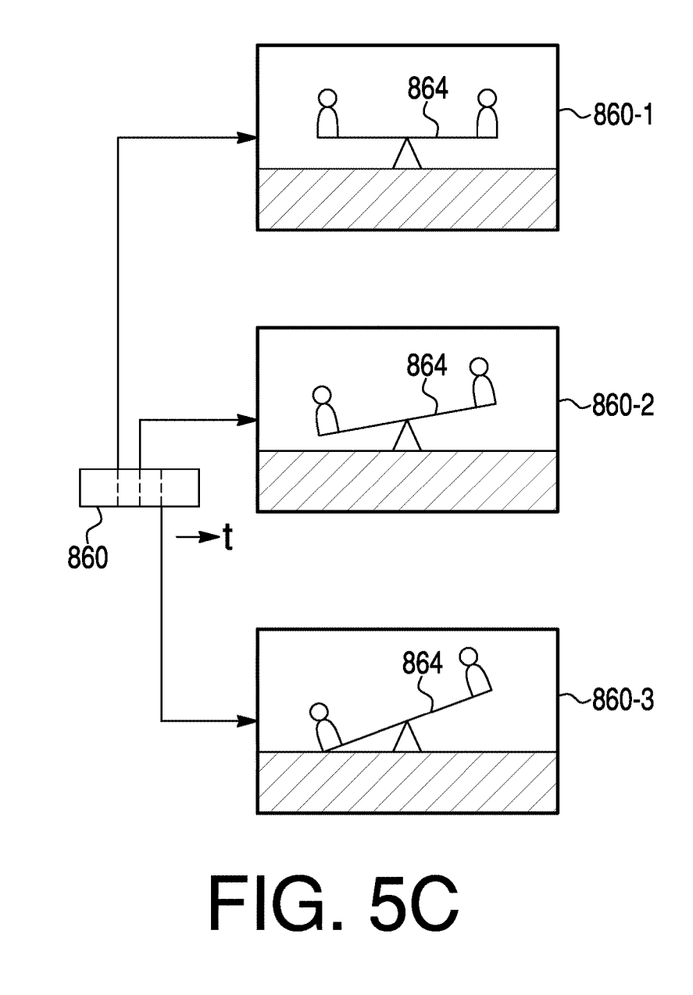
Figure 5D:
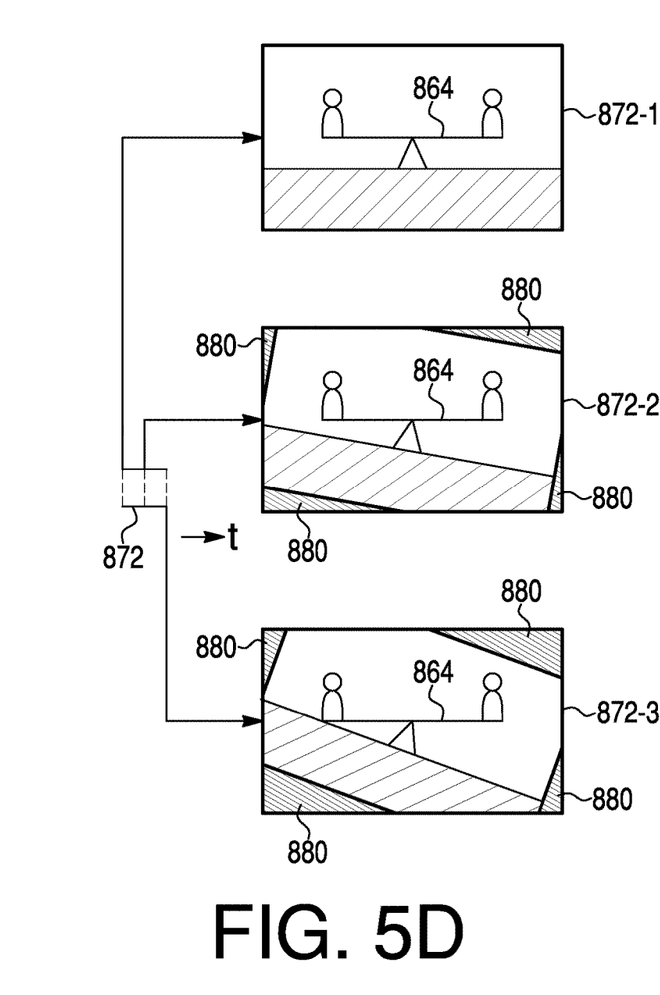

FIG. 5A-D illustrate an example of mode and input logic combination where (302B) a fixed cropping window mode is combined with input logic such that two finger rotational input is translated to rotational movement of the received video against static cropping window defined by edges of the original video thereby eventually producing a rotating effect. Cropping window 862 is depicted slightly smaller than the received video data 860 frames in order for them to be distinguished. Cropping window 862 can be of the same size as the video data 860 frames or it could be larger or smaller than video data 860 frames. FIG. 5A illustrates a two-finger rotational input in the clockwise direction. The beginning of the input 866 determines the first cropping angle 874 (in the example it is arbitrarily set equal to zero), the continuous rotational input 870 creates plurality of intermediate cropping angles 876 and the end of the input 868 determines the last cropping angle 878. FIG. 5B illustrates the first cropping angle 874 that is assigned to the first video frame 860-1 that is associated with first time, one of the intermediate cropping angles 876 that is assigned to the second video frame 860-2 that is associated with second time and the last cropping angle 878 that is assigned to the third video frame 860-3 that is associated with third time. FIG. 5C illustrates the unchanged (original) content of the received video data 860 corresponding to the first time, the second time and the third time. The received video data 860 depicts an object 864 that is a teeter totter device rotating counterclockwise. FIG. 5D illustrates the first 872-1, intermediate 872-2 and last 872-3 frame of the produced video 872 that has the tracked object 864 kept in a horizontal position. It illustrates how rotational input of FIG. 5A can be used to impose intended rotational motion on the received video 860. In this example the intention of the input was to rotate received video 860 in such a way to keep an originally rotating object 864 in horizontal position.

FIG. 5D illustrates areas of no information 880 which can occur with certain mode and input logic combinations and user input. They are areas in produced video 872 where there is no information (i.e., pixels) from the Received video 860 as a result of the cropping window extending beyond the edges of the Received video 860. These areas may be filled with pixels of a certain color or combination of colors including various color patterns. Color patterns may be such that they aim to reduce noticeability or contrast of the areas by, for example, filling the area with color or color patterns similar to color or color patterns of the positively defined pixels in the video or part of the video in the vicinity of the areas 880. This disclosure is not limited to any particular color or combination of colors including various color patterns.

FIG. 1 illustrates step 200 Select/change multiple sequence logic positioned after step 400 in the case that user is not finished with recording process and before user records the next sequence. Alternatively step 200 may be positioned after step 300 in case the new recorded sequence is not the first recorded sequence. Alternatively step 200 may be placed outside of the recording loop (i.e., the repetitive process of recording multiple sequences) if a user is not allowed to change multiple sequence logic for each new recording sequence. Alternatively step 200 may not even be presented to the user, i.e. multiple sequence logic may be preset and not available for change by user. Alternatively, the process may be constructed without steps 400 and 200 to create a process where only one sequence can be recorded and thereafter a new video produced.

Examples of some multiple sequence logic are presented on FIGS. 6A-C, 7A-C and 8A-C but this disclosure is not limited only to those.

FIGS. 6A-C, 7A-C and 8A-C illustrate examples of multiple sequence logic on a simple case of a panning input in direction of y axis only which is plotted on vertical axis against video time on horizontal axis. Same can be applied to other types of input or their combinations. This disclosure is not limited to any particular types of input or combinations of those types.

Figure 6A:
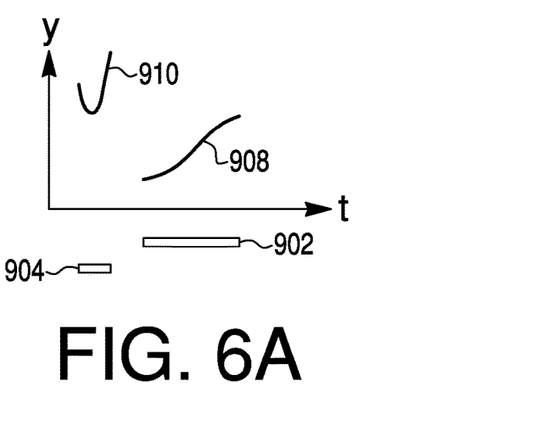
FIGS. 6A-C, 7A-C and 8A-C each illustrate examples of multiple sequence logic for the present method.
Figure 7A:
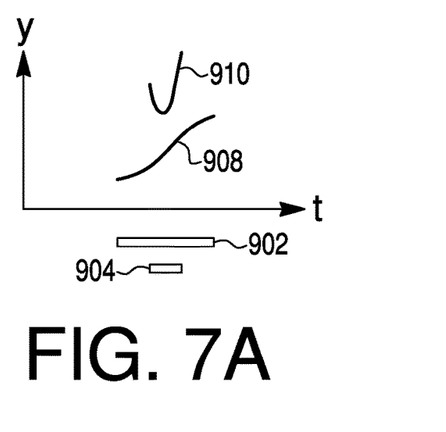
Figure 8A:
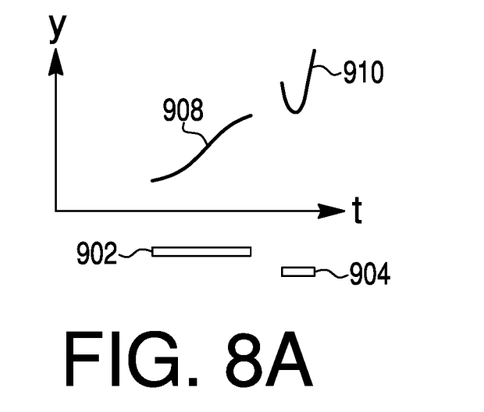

FIG. 6A, FIG. 7A and FIG. 8A illustrate previous recording 902 and subsequent recording 904 depicted versus video time as well as their respective parameters (908 and 910) for three different input cases.

Previous recording 902 may for the purposes of this disclosure be the first recording made or it may be the recording resulting from plurality of the recording sequences made before the subsequent recording 904 is made.

Figure 6B:
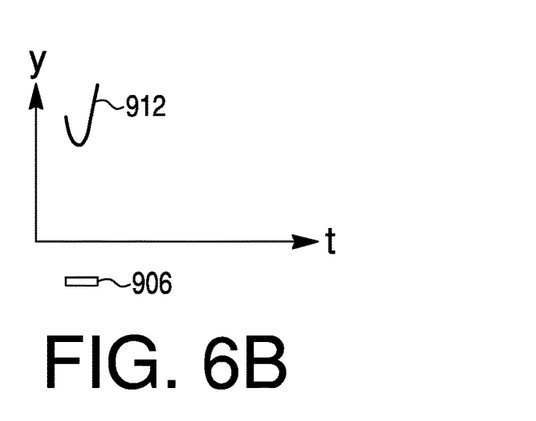
Figure 7B:
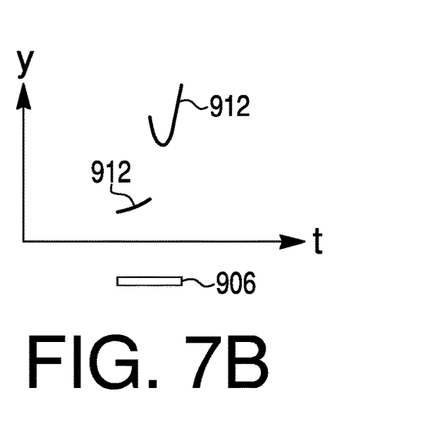
Figure 8B:
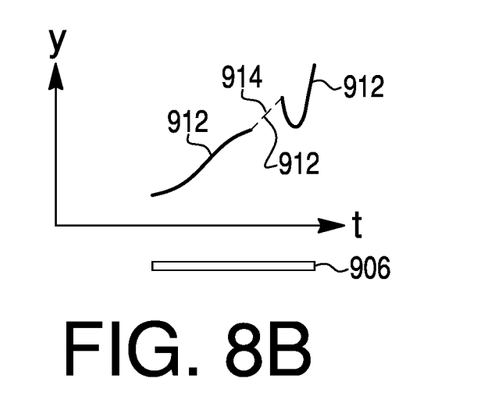

FIG. 6B, FIG. 7B and FIG. 8B illustrate multiple sequence logic such that when subsequent recording 904 is made the previous recording 902 is kept for frames or timestamps preceding the frame or timestamp where subsequent recording 904 is started. The previous recording 902 is deleted for frames or timestamps succeeding the frame or timestamp where subsequent recording 904 is started. The part of the previous recording 902 which is kept is appended by the subsequent recording 904.

Figure 6C:
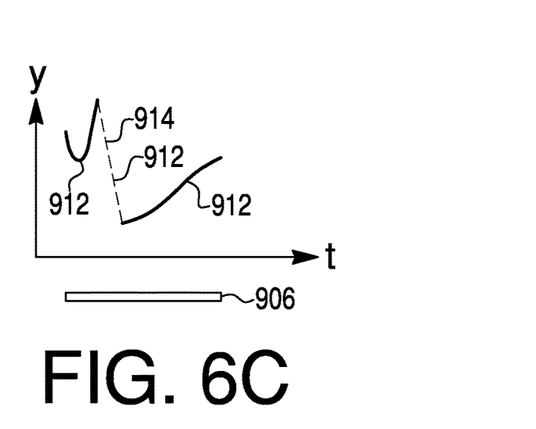
Figure 7C:
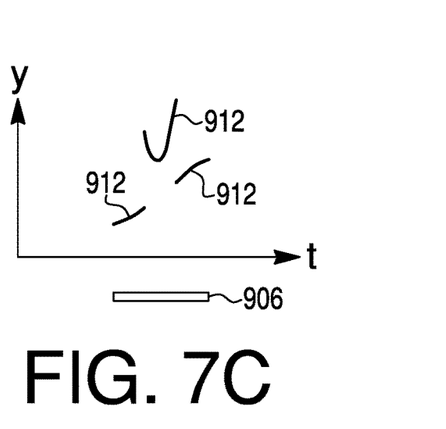
Figure 8C:
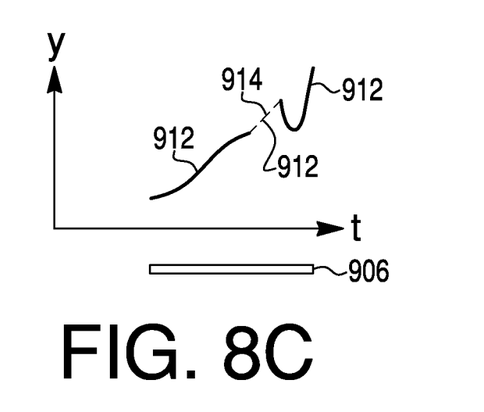

FIG. 6C, FIG. 7C and FIG. 8C illustrate multiple sequence logic such that when subsequent recording 904 is made the previous recording 902 is kept for frames or timestamps preceding the frame or timestamp where subsequent recording 904 is started. The previous recording 902 is overwritten with subsequent recording 904 for any frames or timestamps where previous and subsequent recording are overlapping. The previous recording 902 is kept for frames or timestamps succeeding frame or timestamp where subsequent recording 904 is stopped.

Example of a multiple sequence logic may be logic such that when subsequent recording 904 is made the previous recording 902 is deleted and the subsequent recording 904 is kept.

Example of another multiple sequence logic may be logic where each new recorded sequence is a new and separate sequence that is not influenced by nor influences other sequences and these sequences are used to produce plurality of new videos in step 500.

FIG. 6C, FIG. 8B and FIG. 8C illustrate gaps that might occur in a resulting recording 906 in certain combinations of multiple sequence logic and recording patterns. Illustrated is an interpolated segment 914 where cropping parameters are interpolated linearly. Interpolation may be of a different type such as different types of nonlinear interpolation, Bezier curves, etc. This disclosure is not limited to any particular type of interpolation.

FIG. 7B and FIG. 7C illustrate discontinuities in resulting parameters 912 that might occur in certain combinations of multiple sequence logic and recording patterns. Discontinuities like these may or may not be the desired outcome. In order to help reduce the undesired discontinuities, and manage desired discontinuities, aides may be provided to the user when recording a subsequent recording 904 by displaying parameters of the previous recording 902. For example, setting the cropping window parameters to those of previous parameters 908 (which cropping window can then be used as initial cropping window for subsequent recording 904) when playing or skipping through video enables the user to avoid or manage discontinuity at the start of the subsequent recording 904. Displaying a cropping window derived from previous parameters 908 along with the active cropping window that the user is manipulating during the recording of the subsequent recording 904 the user can reduce or manage discontinuity at the end of the subsequent recording 904 by aligning the two cropping windows or setting the active cropping window relative to cropping window derived from previous parameters 908.

Automatic methods may be used to address the issue of the discontinuity that occurs from user input. Methods may be such as gradually changing the input parameters over a certain time interval, length of which may or may not be left to the users choosing. This disclosure is not limited to any particular method.

FIG. 1 illustrates step 500 Produce new video after step 400 affirmatively answered but without departing from this disclosure video producing may to an extent feasibly take place even before step 400 i.e., during the recording loop. It may take place during the recording sequence or between sequences for parts or all of the recording. The logic of this video producing may favor producing video for parts of recording deemed less like to change in current recording sequence or in the following recording sequences. Video producing may produce the video based on recording as one video sequence. Alternatively, this video sequence may be produced as a series of smaller video sequences effectively splitting the larger video sequence into smaller video sequences which could then be joined together. Such split producing may be favorable when new recording sequence is made because some video sequences may not be affected with new recording and therefore would not require to be produced again.

Video producing may to an extent feasible take place at or near real time of user input. In such case recording may be of a shorter-term character to the extent of how directly the input parameters are being used to produce the video.

Video producing logic may be such to favorably utilize hardware's processing capability such as capability of parallel processing. This disclosure is not limited to any particular video producing logic.

The produced video may be of different resolutions. Resolution may be the result of the size of the cropping window and the Received video 100 resolution or it may be resolution defined by user or in some other way. This disclosure is not limited to any particular resolution or way to determine the resolution.

Figure 2:
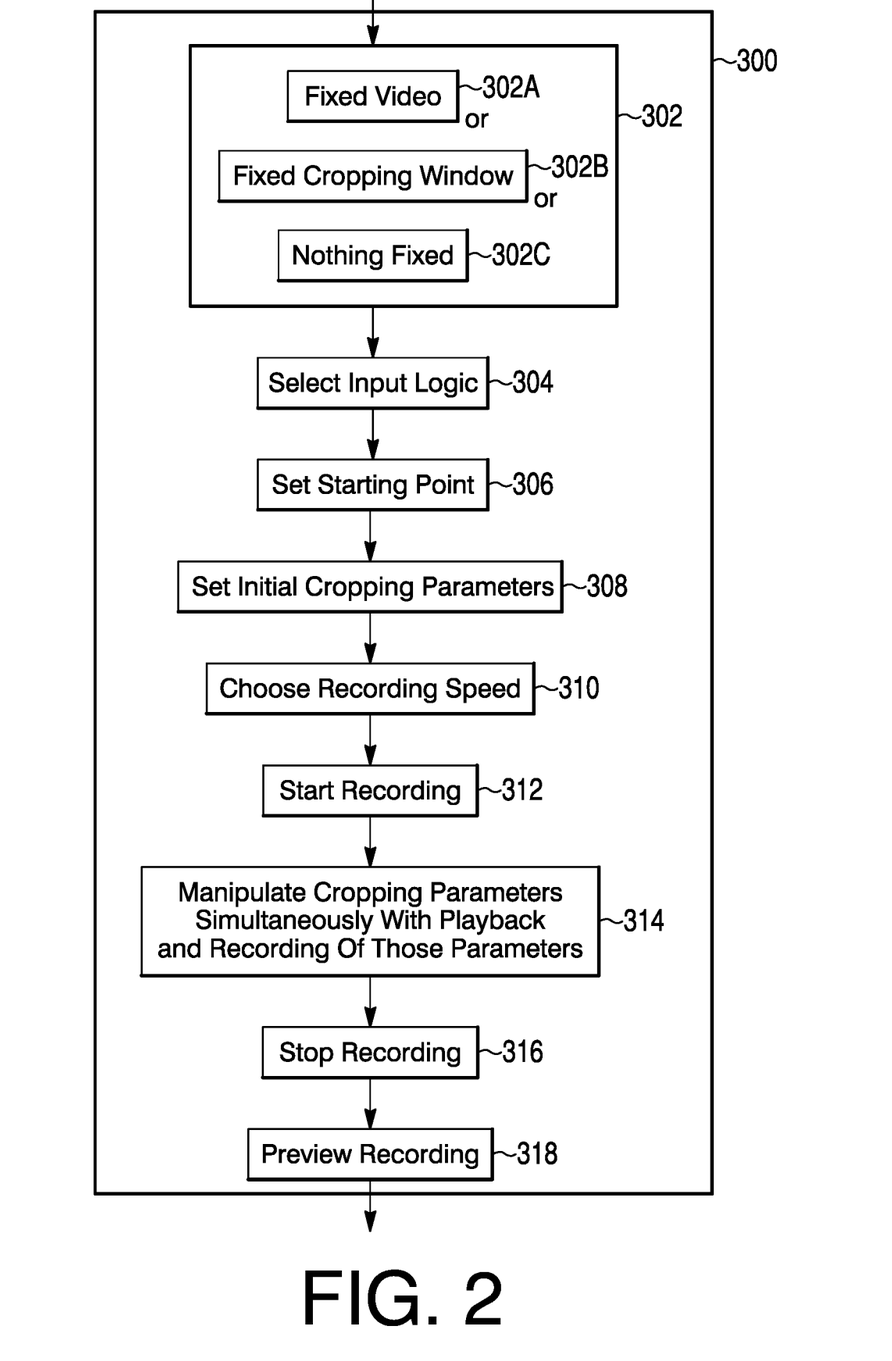
FIG. 2 depicts the substeps involved with the step 300 Record a sequence.

FIG. 2 depicts step 318 Preview recording at the end of step 300 Record a sequence. Previewing recording may be for example achieved by playing the 100 Received video and simultaneously displaying the cropping window derived from resulting parameters 912. Or it may be achieved by playing how the produced video would appear. For that purpose, a type of quick preview tool may be used which does not produce the new video but alters received video 100 playback in accordance with the resulting parameters 912 to show, or preview, how a produced video would look or appear.

FIG. 2 illustrates steps 302 Select mode and 304 Select input logic available in every recording of a sequence. Without departing from this disclosure steps 302 and 304 may for example only be available at the beginning of the recording loop allowing only for a single mode and input logic combination for a recording loop.

Without departing from present disclosure recording process may be accomplished utilizing multiple parallel layers where each layer enables recording using certain particular mode and input logic combination. By selecting a layer in which to record a sequence the user automatically selects particular mode and input logic combination and records a sequence which affects only the recording in selected layer i.e. is a subsequent recording 904 to previous recording 902 (if any) in selected layer. Recorded parameters in different layers may be superimposed to produce their combined effect on produced video. Example of such layered recording process may be one where there are two layers each having mode and input logic combination as illustrated in FIG. 3A-D in order to enable user to independently record vertical panning motion and horizontal panning motion. Another example of such layered recording process may be one where one layer has mode and input logic combination as illustrated in FIGS. 3A-D and the other layer has mode and input logic combination as illustrated in FIG. 5A-D. Such process may for example enable user to impose rotational input (e.g. to eliminate existing undesired rotation of the Received video 100) on the Received video 100 and to crop it with a smaller cropping window and possibly to introduce a panning effect. This particular layered process example might require establishing a hierarchy between layers because it would not be the same if video is first cropped and then rotated or first rotated and then cropped. This disclosure is not limited to the examples above nor to any number of layers or combinations of mode and input logic combinations, including combinations with different multiple sequence logic and hierarchies.

Aides may be provided to user to improve control of recording parameters. For that purpose, aides such as grids or horizontal and vertical lines or references may be displayed. For example mode and input logic combination as illustrated in FIG. 5A-D may have aid in the form of vertical and/or horizontal line(s) from the center of the video displayed over the Received video 100 and vertical and/or horizontal reference displayed over the fixed screen so that user can easily set rotational angle to 0 degrees when desired. Another aid may be in the form of numerically displaying the rotational angle imposed by user. Another aid may be to have the user input modified so that the rotational angle has a tendency to reach and maintain certain values. For example, the angle may have a tendency to reach and maintain value of 0 degrees. The tendency may appear to user as if the angle has a tendency to "snap" to 0 degrees. For example mode and input logic combination as illustrated in FIG. 3A-D may have aid in the form of vertical and/or horizontal lines displayed over the cropping window to help user position the cropping window over Received video 100 by better managing content of Received video 100 within the cropping window. This may for example help user to center an Object 828. This disclosure is not limited to the above examples nor is it limited to any particular aides.

Figure 9:
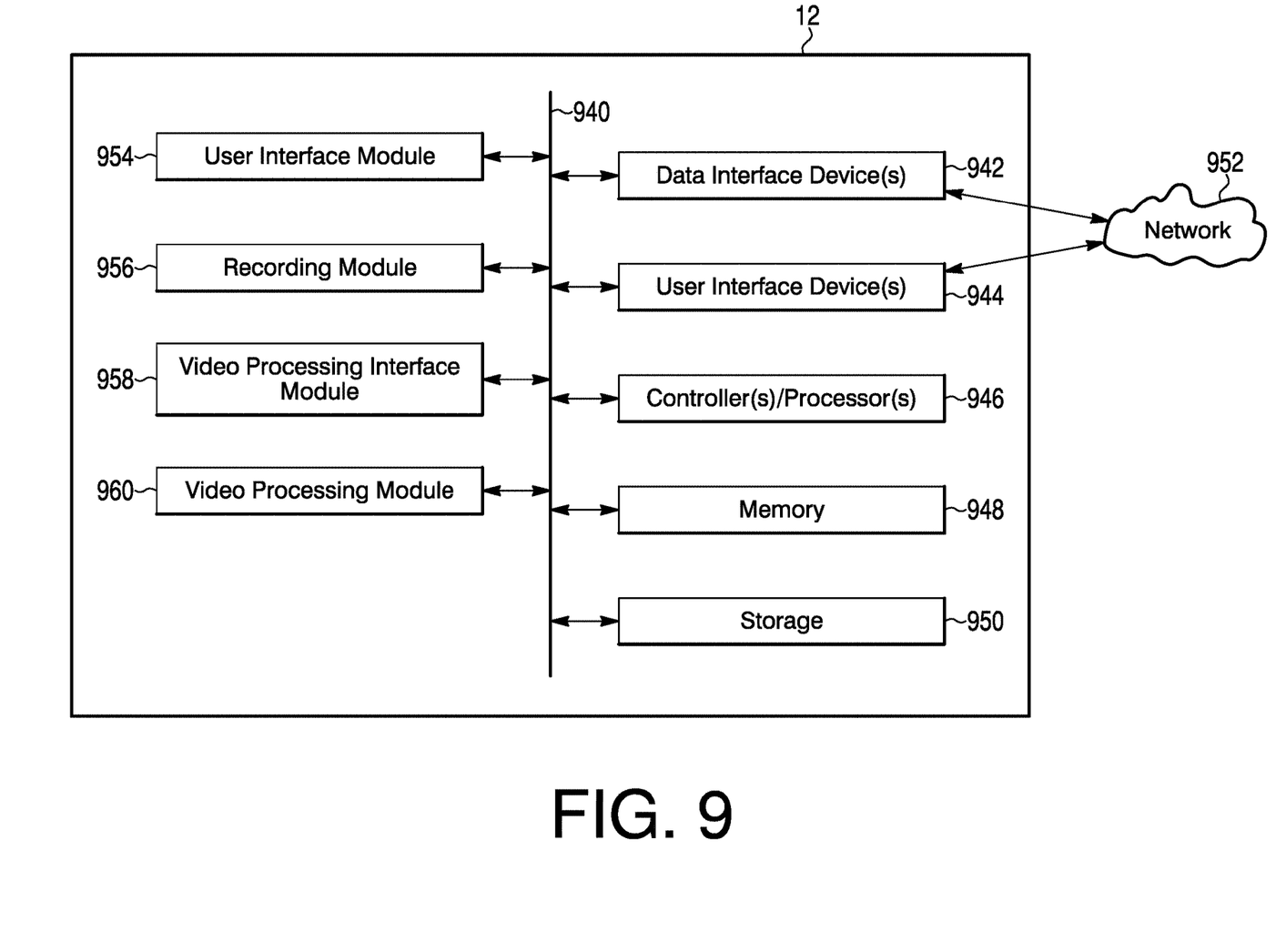
FIG. 9 is a schematic of the hardware portion of device 12 used in the present method.

FIG. 9 illustrate block diagrams conceptually illustrating example components of a system 10 including one or more of a device 12 and a server 22. Whenever device 12 is illustrated and referred to, the server 22 could be illustrated and referred to instead and in place of without departing from present disclosure. Depending upon how the system is structured, some of the components illustrated in FIG. 9 as part of the device 12 or the server 22 may be included only in the device 12 or in the server 22, or may be distributed across multiple devices 12 and/or servers 22. Other components not illustrated may also be included in the device 12 and/or the server 22. In operation, the system 10 may include computer-readable and computer-executable instructions that reside in storage 950 on the device 12/server 22. Examples of electronic devices may include portable devices (e.g. smart phone, tablet, a camera (such as a 360° video camera), or the like), computers (e.g., a desktop, a laptop, a server or the like) or the like. The device 12/server 22 may also be a component of any of the abovementioned devices or systems.

As illustrated in FIG. 9, the device 12/server 22 may include an address/data bus 940 for conveying data among components of the device 12. Each component within the device 12/server 22 may also be directly connected to other components in addition to (or instead of) being connected to other components across the bus 940.

The device 12/server 22 may include one or more controllers/processors 946 comprising one-or-more central processing units (CPUs) for processing data and computer-readable instructions and a memory 948 for storing data and instructions. The memory 948 may include volatile random-access memory (RAM), non-volatile read only memory (ROM), non-volatile magneto resistive (MRAM) and/or other types of memory. The device 12/server 22 may also include a data storage component 950 for storing data and processor-executable instructions. The data storage component 950 may include one or more non-volatile storage types such as magnetic storage, optical storage, solid-state storage, etc. The device 12/server 22 may also be connected to a removable or external nonvolatile memory and/or storage (such as a removable memory card, memory key drive, networked storage, etc.) through the data interfaces devices 942.

The device 12/server 22 includes data 942 and user 944 interface device(s). A variety of components may be connected to the device 12/server 22 through data 942 and user 944 interface device(s), such as camera(s) 14 and microphone(s) 16. However, the disclosure is not limited thereto and the device 12/server 22 may not include an integrated camera or microphone. Thus, the camera(s) 14, microphone(s) 16 and/or other components may be integrated into the device 12 or may be separate without departing from the disclosure.

Data 942 and user 944 interface device(s) may be configured to operate with a network 952, for example a wireless local area network (WLAN) (such as WiFi), Bluetooth, zigbee and/or wireless networks, such as a Long Term Evolution (LTE) network, WiMAX network, 3G network, etc. The network 952 may include a local or private network or may include a wide network such as the internet. Devices may be connected to the network 952 through either wired or wireless connections.

Data 942 and user 944 interface device(s) may also include an interface for an external peripheral device connection such as universal serial bus (USB), Fire Wire, Thunderbolt, Ethernet port or other connection protocol that may connect to networks 952. Data 942 and user 944 interface device(s) may also include a connection to an antenna (not shown) to connect one or more networks 952 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 12/server 22 further includes user interface module 954, recording module 956, video processing interface module 958 and video processing module 960 which may comprise processor-executable instructions stored in storage 950 to be executed by controller(s)/processor(s) 946 (e.g., software, firmware), hardware, or some combination thereof. For example, components of the user interface module 954, recording module 956, video processing interface module 958 or video processing module 960 may be part of a software application running in the foreground and/or background on the device 12/server 22. The user interface module 954, recording module 956, video processing interface module 958 and video processing module 960 may control the device 12/server 22 as discussed above, for example with regard to FIGS. 1 and 2. Some or all of the controllers/modules of the user interface module 954, recording module 956, video processing interface module 958 or video processing module 960 may be executable instructions that may be embedded in hardware or firmware in addition to, or instead of, software. In one embodiment, the device 12/server 22 may operate using an Android® operating system (such as Android® 9.0 Pie, Android® 10.0 Android 10 or the like), an Amazon® operating system (such as FireOS or the like) or an iOS® operating system (such as iOS 14 or the like).

The user interface module 954 provides to the user the information such as playing the video, displaying the cropping window that is responsive to the user manipulation or the like. It also allows the user to control the video playback through video controls, to accomplish recording process and various other steps of the system 10.

The recording module 956 is responsible for recording dynamically changing cropping parameters in an appropriate manner so that based on the recorded parameters a cropping pattern can be derived that is an exact or approximate match with original cropping pattern defined by the user.

The video processing interface module 958 may be used when there is a need to transform the information contained in recorded cropping parameters to a form suitable for video processing module 960.

The video processing module 960 is the module that processes the received video data based on cropping parameters received from the video processing interface module 958 or directly from recorded parameters and produces new video data. The video processing module 960 may use off-the-shelf video processing software/firmware/hardware with its own video filters or with custom programmed video filters or a combination thereof in order to achieve the functionality of this disclosure. The video processing module 960 may use video processing software/firmware/hardware programmed fully or partially (in conjunction with parts of other software/firmware/hardware) for the purpose and in order to achieve the functionality of this disclosure.

Executable computer instructions for operating the device 12/server 22 and its various components may be executed by the controller(s)/processor(s) 946, using the memory 948 as temporary "working" storage at runtime. The executable instructions may be stored in a non-transitory manner in non-volatile memory 948, storage 950, or an external device. Alternatively, some or all of the executable instructions may be embedded in hardware or firmware in addition to or instead of software.

The components of the device(s) 12/server 22, as illustrated in FIG. 9, are exemplary, and may be located a stand-alone device or may be included, in whole or in part, as a component of a larger device or system.

The concepts disclosed herein may be applied within a number of different devices and computer systems, including, for example, mobile device (smart phones), tablet computers, laptop computers, general-purpose computing systems, server-client computing systems, mainframe computing systems, personal digital assistants (PDAs), video capturing devices, distributed computing environments, etc. Thus the modules, components and/or processes described above may be combined or rearranged without departing from the scope of the present disclosure. The functionality of any module described above may be allocated among multiple modules or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The preceding description and illustrations of the disclosed embodiments is provided in order to enable a person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein. While various aspects and embodiments have been disclosed, other aspects and embodiments are possible. The various aspects and embodiments disclosed are for purposes of illustration and are not intended to be limiting.

What is claimed:

1. A method for altering pan and/or zoom and/or tilt for editing videos, on a computing device, comprising:
   retrieving a video recording onto a playback device screen;
   choosing a timestamp or frame on the video recording, at which timestamp or frame editing will be initiated;
   responsive to a first manual user input, either creating, on said screen being used for video playback, a cropping window, defined by cropping parameters comprising lateral and vertical position, zoom, and tilt in relation to the video, or defining a video image display against a cropping window by defining cropping parameters comprising video image zoom, vertical and lateral position, and tilt, or both simultaneously;

playing the video and simultaneously with video playback maneuvering, responsive to a second manual user input, either the cropping window itself in relation to the video, or the video image in relation to the cropping window, or both, simultaneously, resulting in a plurality of cropping parameters in relation to video time;

recording the cropping parameters as defined through user input in relation to video time; and, newly creating a separate video from images of an original video that are cropped using recorded cropping parameters relating to times of said images.

2. The method as in claim 1, further comprising: choosing a desired playback speed for playing said video.

3. The method as in claim 1, wherein said cropping window is defined by said cropping parameters comprising said lateral and vertical position, zoom, and tilt in relation to said video and said video image display is defined against said cropping window by said cropping parameters comprising said video image zoom, vertical and lateral position, and tilt.

4. The method as in claim 1, wherein said cropping parameters comprise said lateral and vertical position, zoom, tilt in relation to said video, and video image zoom.

5. The method as in claim 1, wherein said first manual user input is different from said second manual user input.

6. The method as in claim 5, wherein said first manual user input is received from a first input device and said second manual user input is received from a second input devices, wherein said first user input device is different from said second user input device.

7. The method as in claim 1, wherein said first manual user input is equivalent to said second manual user input.

8. The method as in claim 1, wherein said first manual user input is received at a different time from said second manual user input.

9. The method as in claim 1, further comprising playing the video, and simultaneously with the video playing, maneuvering said cropping window itself in relation to said video while simultaneously maneuvering said video image in relation to said cropping window, responsive to said second manual user input, resulting in said plurality of cropping parameters in relation to video time.

10. The method as in claim 1, wherein said cropping parameters are interpolated linearly in relation to video time.

11. The method as in claim 1, wherein said cropping parameters are interpolated non-linearly in relation to video time.

12. The method as in claim 1, further comprising: assigning said cropping parameters to at least one of a particular timestamp of said original video and a particular frame of said original video.

13. The method as in claim 1, wherein said first user input comprises at least one of a rotational input, a pinching input, and a panning input.

14. A method for altering pan and/or zoom and/or tilt for editing videos, on a computing device, comprising:

retrieving a video recording onto a playback device screen;

choosing a timestamp or frame on the video recording, at which timestamp or frame editing will be initiated;

responsive to a first manual user input, either creating, on said screen being used for video playback, a cropping window, defined by cropping parameters comprising lateral and vertical position, zoom, and tilt in relation to the video, or defining a video image display against a cropping window by defining cropping parameters comprising video image zoom, vertical and lateral position, and tilt, or both simultaneously;

playing the video and simultaneously with video playback-maneuvering, responsive to a second manual user input, either the video image in relation to the cropping window or the cropping window itself in relation to the video, or both simultaneously, within the screen image of the video playback;

recording and saving the images captured within the cropping window during playback as a newly created separate video.

15. The method as in claim 14, further comprising: choosing a desired playback speed for playing said video.

16. The method as in claim 14, wherein said cropping parameters comprise said lateral and vertical position, zoom, tilt in relation to said video, and video image zoom.

17. A system for altering pan and/or zoom and/or tilt for editing videos, using a computing device, comprising:

a user interface module having a screen for retrieving a video recording onto for playback editing on said module;

a programmable processor connected to said module enabling a choosing of a timestamp or frame on the video recording, at which timestamp or frame editing will be initiated on said module;

said processor further programmed to enable, responsive to a first manual user input, either creating, on said screen being used for video playback, a cropping window, defined by cropping parameters comprising lateral and vertical position, zoom, and tilt in relation to the video, or defining, cropping parameters comprising a video image display against a cropping window by defining video image zoom, vertical and lateral position, and tilt, or both simultaneously;

said processor further programmed to enable playing the video and simultaneously with video playback maneuvering, responsive to second manual user input, either the cropping window itself in relation to the video, or the video image in relation to the cropping window, or both, simultaneously, resulting in a plurality of cropping parameters in relation to video time;

an electronic memory connected to said processor for recording the cropping parameters as defined through user input in relation to video time; and, using said processor and memory, newly creating and storing a separate video from images of an original video that are cropped using recorded cropping parameters relating to times of said images.

18. The system as in claim 17, wherein: said processor is programmed to enable a selection of a desired playback speed for playing said video.

19. The system as in claim 17, wherein: said user interface module is a touchscreen device.

20. The system as in claim 19, wherein: said touchscreen device is connected to a network including said processor.

* * * * *